No. 753,955. PATENTED MAR. 8, 1904.
G. H. CLARK.
HOOF PAD.
APPLICATION FILED NOV. 18, 1901.
NO MODEL.

Witnesses.
Thomas J. Drummond.
Adolph H. Kaiser.

Inventor.
George H. Clark,
by Crosby & Gregory
attys.

No. 753,955. Patented March 8, 1904.

UNITED STATES PATENT OFFICE.

GEORGE H. CLARK, OF BOSTON, MASSACHUSETTS, ASSIGNOR OF ONE-HALF TO ELLERY C. WRIGHT, OF CAMPELLO, MASSACHUSETTS.

HOOF-PAD.

SPECIFICATION forming part of Letters Patent No. 753,955, dated March 8, 1904.

Application filed November 18, 1901. Serial No. 82,615. (No model.)

*To all whom it may concern:*

Be it known that I, GEORGE H. CLARK, a citizen of the United States, and a resident of Boston, county of Suffolk, State of Massachusetts, have invented an Improvement in Hoof-Pads, of which the following description, in connection with the accompanying drawings, is a specification, like letters on the drawings representing like parts.

This invention has for its object the production of a novel hoof-pad adapted to be interposed between the usual horseshoe and the hoof and present at the inner edge of the hoof a yielding rib, cushion, or roll, preferably hollow and acting as a fender, said fender extending upwardly above the level of the body of the pad underlying the hoof.

In the production of my fender as a part of the pad I prefer to take a flexible tube and inclose it preferably between parts of two plies of material shaped to embrace and hold the tube firmly in position. Preferably the material entering into my improved pad will be vulcanized to thereby make the separate parts into one piece.

Figure 1:
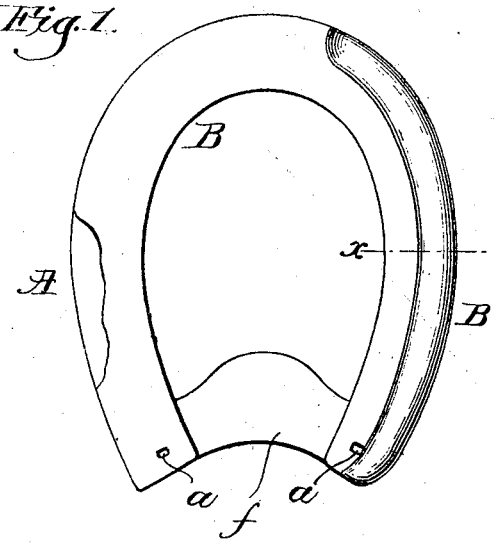
Figure 2:
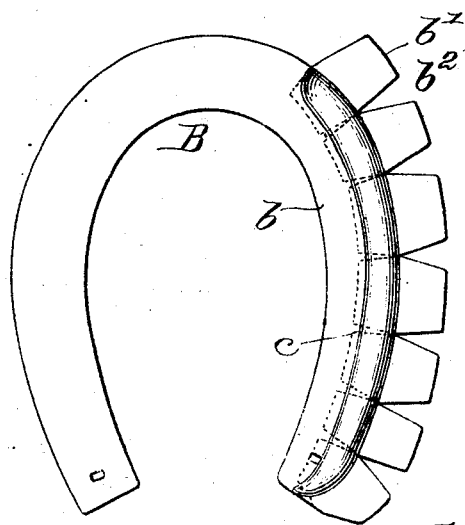
Figure 3:
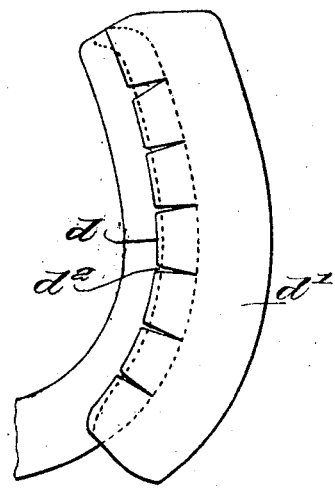
Figure 4:
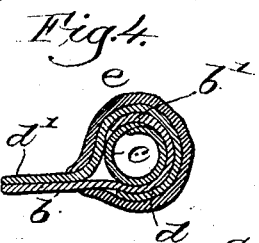

Figure 1 is a top view of my novel pad resting on a horseshoe; Fig. 2, a detail showing one of the plies of the pad laid out flat with the tube in place. Fig. 3 shows the parts represented in Fig. 2 applied to another ply of the pad. Fig. 4 is a section enlarged on the line $x$, Fig. 1.

In the drawings, A represents a conventional horseshoe having two upwardly-extended studs $a$.

In the production of my novel pad B in one of the best forms now known to me I may take, say, a ply $b$ of suitable material, preferably a material that may be incorporated with other material by vulcanization in any usual way. I cut this material preferably in the form shown in Fig. 2, leaving a series of projecting fingers $b'$, separated by spaces $b^2$ of such shape as will enable said fingers to be inturned to embrace a tube or roll $c$ to act as a fender, said ply and tube being preferably coated with gum or cement, such as commonly employed in the production of articles of india-rubber. After wrapping the fingers $b'$ about the tube $c$ I turn the parts, Fig. 2, over and lay the tube on a series of fingers $d$ of a second ply $d'$, notched at $d^2$ in the production of said fingers, and I then turn the outer edge of the ply $d'$ upwardly and inwardly to overlie and envelop the fingers $b'$ and tube, substantially as shown in Fig. 4, the tube thus projecting to one side and above the plane of the pad. By using two plies of material, as I have shown and prefer, to embrace the tube from opposite directions the greatest efficiency and strength of the pad are secured; but I could make a very desirable pad by embracing the tube with but one of the plies from one direction. I prefer as a finishing layer to apply to the structure, Fig. 3, a strip of india-rubber $e$.

All the material used in the pad will preferably be such that it may be vulcanized into one piece. The material used may be of any desired thickness, and more or less of it may be of fabric or textile material.

Fig. 1 shows the pad provided with a frog-piece $f$ to underlie the frog of the hoof, and the piece $f$ may form an integral part of the hoof-pad or be an independent piece overlying part of the hoof-pad. My invention of the hollow fender composed of the tube enveloped, as described, and extended from that part of the pad which is to lie at the inner side of the hoof may, however, be used to advantage with a pad from which the frog-piece is omitted. In most instances of the use of my invention the rib, cushion, or fender of the pad will extend between the shoe and hoof only at the inner side of the hoof.

It will be obvious that with a pad having a yielding fender to project only beyond the inner side of the hoof that my improved pad must be made rights and lefts.

The body of the pad has suitable holes for the reception of studs $a$ or screws by which to attach the pad to the shoe before driving the usual nails through the shoe and the web of the pad into the hoof.

By making the fender hollow the weight to be carried by the foot is decreased, and the diameter of the fender may be increased as required by a particular horse without materially increasing the weight of the pad.

Having fully described my invention, what I claim as new, and desire to secure by Letters Patent, is—

1. A hoof-pad having a flange to be interposed between the shoe and the hoof, and provided with a yielding hollow fender projecting above the plane of and from one side of the pad to fit the exterior of the hoof.

2. A hoof-pad to be interposed between a shoe and hoof, said pad having a fender composed of a tube secured to the pad and wrapped in a ply having its outer edges cut to present fingers.

3. A hoof-pad to be interposed between a shoe and hoof, said pad having a fender composed of a tube secured to the pad and wrapped in a ply having its outer edges cut to present fingers, said parts being vulcanized.

4. A hoof-pad to be interposed between a shoe and hoof, said pad comprising a tube wrapped between a plurality of plies having their edges cut to present fingers, said parts being vulcanized together.

5. A hoof-pad having a flange to be interposed between the shoe and hoof, and provided with a yielding hollow fender to fit the exterior of the hoof, the flange of the pad being connected by a portion to constitute a frog-pad to sustain the frog of the hoof.

6. A hoof-pad having a flange to be interposed between the shoe and the hoof and provided with a yielding hollow fender to fit the exterior of the hoof, said fender being separate from and secured to the flange.

In testimony whereof I have signed my name to this specification in the presence of two subscribing witnesses.

GEORGE H. CLARK.

Witnesses:
 GEO. H. MAXWELL,
 EDITH M. STODDARD.